Figure 3:
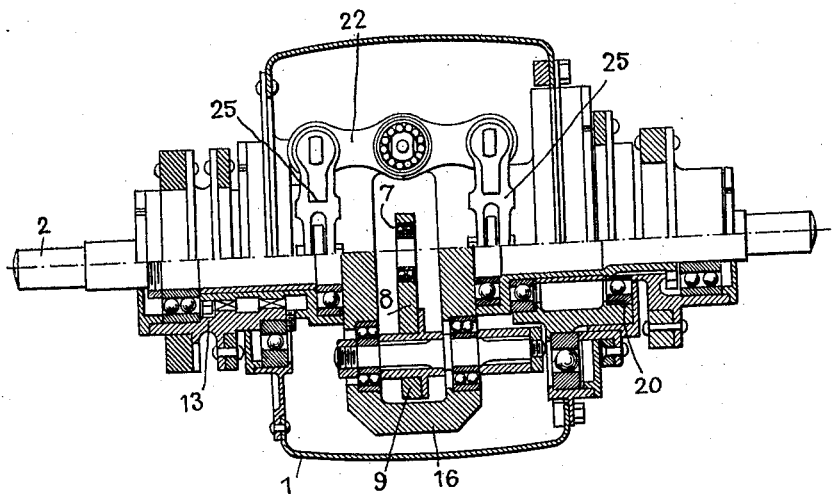

Feb. 2, 1932.   J. QUESSETTE   1,843,734
COMBINATION CONTROL APPARATUS FOR FLYING AND OTHER
CONTROLS FOR AEROPLANES OR FOR LIKE PURPOSES
Filed Dec. 5, 1929   3 Sheets-Sheet 1
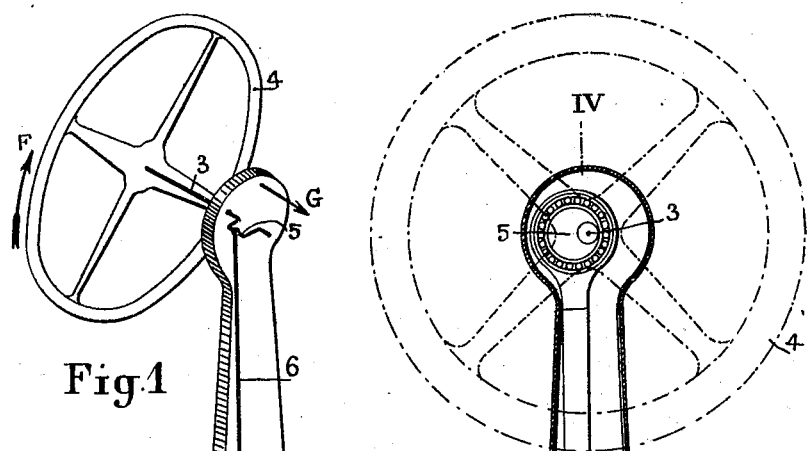
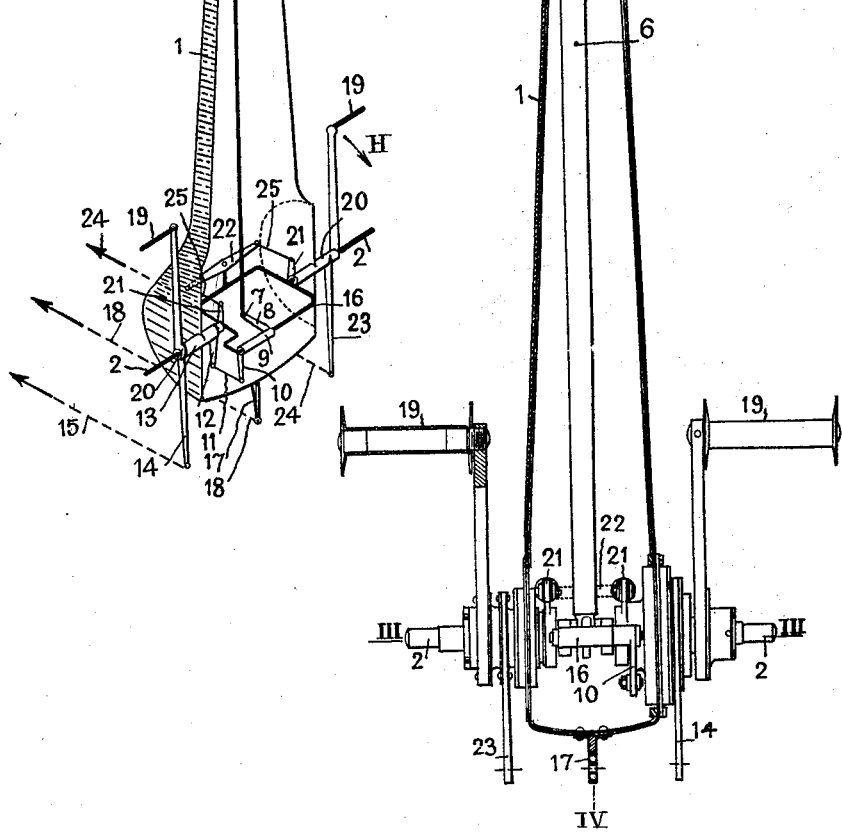
JEAN QUESSETTE
INVENTOR
BY *Haseltine, Lake & Co.*
ATTORNEYS Feb. 2, 1932.                J. QUESSETTE                  1,843,734
      COMBINATION CONTROL APPARATUS FOR FLYING AND OTHER
         CONTROLS FOR AEROPLANES OR FOR LIKE PURPOSES
                 Filed Dec. 5, 1929        3 Sheets-Sheet 2

JEAN QUESSETTE
INVENTOR

BY Haseltine, Lake & Co.,
ATTORNEYS

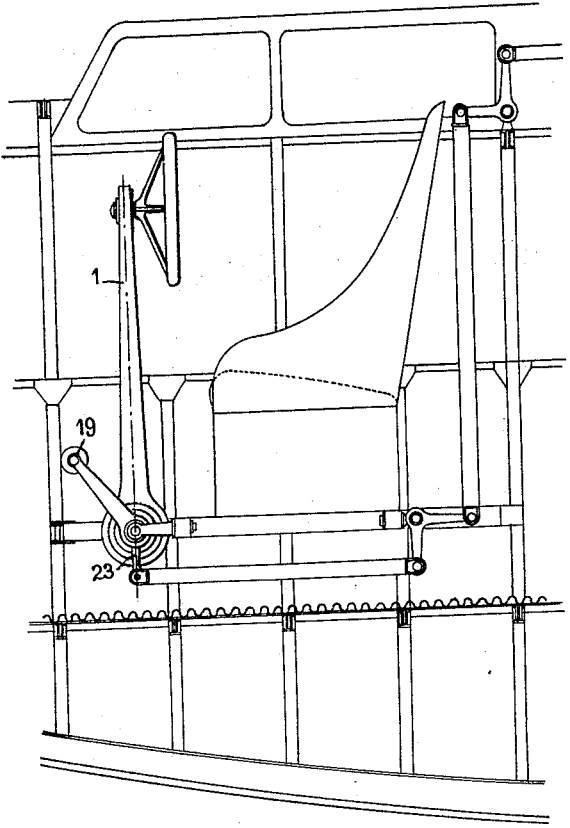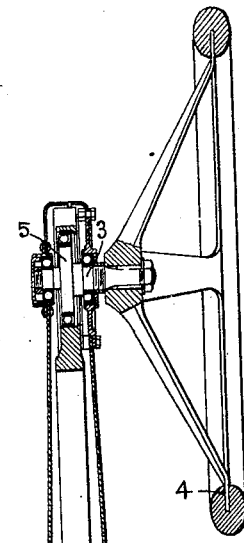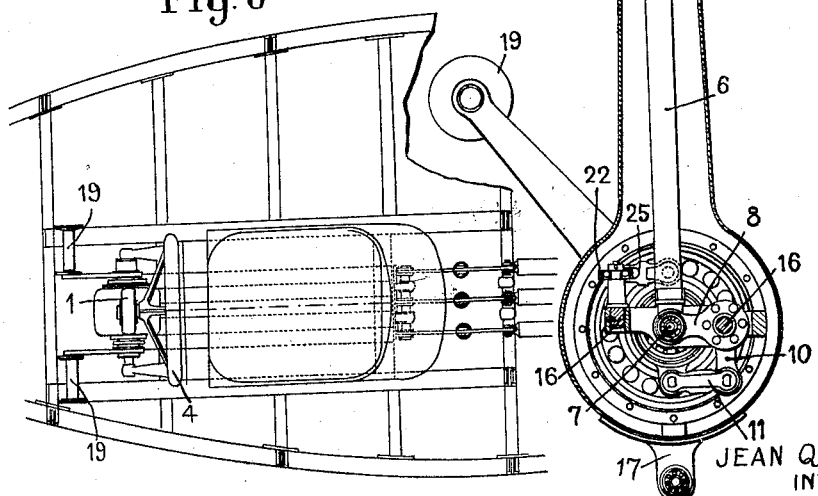

Patented Feb. 2, 1932

1,843,734

UNITED STATES PATENT OFFICE

JEAN QUESSETTE, OF LE MANS, FRANCE

COMBINATION CONTROL APPARATUS FOR FLYING AND OTHER CONTROLS FOR AEROPLANES OR FOR LIKE PURPOSES

Application filed December 5, 1929, Serial No. 411,767, and in France May 8, 1929.

The present invention relates to a combination control apparatus for flying and other controls for aeroplanes or for like purposes.

For the operation of aeroplanes, a certain number of controls are generally employed which are connected to the several controlled devices and which usually comprise parts acting independently, which parts are disposed upon the finished aeroplane in different locations and may also differ in size and form according to the general arrangement of the said aeroplane. In said structures, the reactions of the different controls are brought to bear upon different points according to the controls in action, such points differing in one aeroplane from another, and having ordinarily no direct mutual connection. This construction often occasions a defective rigidity of the said controls, and it may even give rise to disturbances, (such as vibrations, irregular control, etc.), which offers prejudice to the proper flight of the aeroplane.

The pilot, in order to effect certain evolutions of his machine, must suitably operate his controls, and for instance he will cause the machine to back or lean to the right or left (wing warping) by turning his steering wheel in the proper direction, and he thus produces a certain couple upon this wheel.

This pilot's control cannot be directly used to operate the rod-and-link gear for the controlled devices, as said gear is usually operated by a straight motion, and some force is thus required. Such force can however be readily applied by a lever which is suitably combined with the hand wheel.

Due to the fact that the pilot furnishes a couple about a certain axis, thus producing a force given by a lever situated at a certain point, it is necessary that reactions shall take place at certain points, so as to afford at each instant the equilibrium of the different forces or couples employed.

Since the pilot performs a certain amount of work while producing the rotation according to a couple, and since it is obviously necessary that this work shall be represented as completely as possible in the form of work rendered by the lever, it being indispensable that the forces of the reaction shall always execute a work which is practically null, and this condition can only be obtained by determining as completely as possible the points of reaction, or the points of application of the forces.

The aforesaid statements relative to the wing warping operation which is given by way of example, are also applicable in an analogous manner to the other two controls, that is, for side steering and for elevating.

This manner of considering the functioning of the mechanism for the control of an aeroplane led to the novel and special conception embodied in the combined controlling device, the subject-matter of the present invention. This conception consists in the construction of a combined control apparatus which is acted upon by the pilot by means of forces and couples, and from which proceed the controls resulting from the transformation of the said pilot's action, usually in the shape of forces, and the said apparatus is retained by suitable reactions (forces and couples). The said novel apparatus will afford all necessary combinations, as will presently appear hereinafter.

For this purpose the combined apparatus according to the invention comprises:

(a) A containing device in the form of a casing of reduced size adapted to contain and to support the combined mechanism, which may be constructed as desired, (b) Operating means, (hand wheel and pedal) which are within reach of the pilot and are mounted on said casing, (c) Elements from which the movement proceeds (such as levers) suitably disposed for the operating of the rod and link gear driving the controls for steering, elevating and wing warping, said elements being mounted on the said casing, (d) Points of reaction connected to the said casing, these being fixed points adapted to maintain the members securing the casing to the aeroplane, the object of the whole being to assure at all times the equilibrium of the several forces, couples, or reactions employed, while providing for a greater facility in handling the apparatus, also reducing the size and weight, and affording a greater rigidity for the controlling devices.

The accompanying drawings show by way of example a form of construction of the said combination apparatus according to the invention, which is adapted for use upon aeroplanes.

Fig. 1 is a diagrammatic general perspective view of a form of construction of said novel combination control apparatus, embodying the principles of this invention, Fig. 2 is a vertical axial section of the same apparatus, the parts being shown in practical form, Figs. 3 and 4 are respectively sections on the lines III—III and IV—IV of Fig. 2, Figs. 5 and 6 are respectively diagrammatic elevational and plan views showing the disposition of the said combination control apparatus upon an aeroplane.

The casing 1 which has the elongated form shown in Figs. 1—2—4—5 is pivoted at its lower part to a rigid axle 2 secured to the main body of the aeroplane, and constitutes at its upper part a bearing for the shaft 3 controlling the wing warping. The said shaft, which carries the controlling wheel 4, comprises a crank or eccentric 5 to which is pivoted a connecting rod 6 whose lower end is pivoted at 7 to a crank 8 secured to a sleeve 9 to which is keyed a crank 10. This latter crank is connected by a rod 11 to a lever 12 secured to a socket 13 rotatable on a tubular shaft 20 which is coaxial with the said axle 2 and carries at the exterior of the casing 1 to a lever 14 to which is pivoted a suitable driving device 15 for the control of the wing warping, having any desired disposition.

The sleeve 9 is pivoted on one side of a rigid frame 16 which is rigidly connected to the axle 2 and which thus has a fixed position.

At the lower end of the casing 1 is mounted a lever 17 controlling the elevators by suitable power transmitting means 18.

For the steering control, the apparatus comprises two pedals 19 secured to sections of tubular shaft 20 which are pivoted to the axle 2 and are connected together by the levers 21, the rods 25, and the rocking lever 22. Said sections 20 are secured to a controlling lever 23 connected to an adequate power transmission device 24.

For the warping of a wing, the pilot turns acts upon the wheel 4 in the direction of the arrow F or in the contrary direction in order to determine—by means of the parts 3—5—6—8—9—10—11—12—13—14—the driving of the power transmission device in the proper direction.

The elevators are controlled by pivoting the casing 1 forward in the direction of the arrow G, or in the contrary direction, about its axle 2, and this motion is imparted by the lever 17 or arm to the driving device 18.

The steering is effected by the pedals 19 in the direction of the arrow H, or in the contrary direction. The said pedals which are connected together by the said lever 22, actuate the power transmission means 24 in the proper direction.

Due to the combination of the several controlling parts, all operations can be effected with great ease and irrespectively of the position of the parts which are not actuated. In fact, the pivoting point 7 of the rod 6 on the lever 8 is in the mean position on the axis of the axle 2, and is never separated therefrom except by a short distance as compared with the length of the rod 6, and hence the motion of the casing 1 for controlling the elevator will have practically no effect upon the wing warping parts. In like manner, the steering control can be effected at all times irrespectively of the position of the casing 1 as well as that of the wing warping controls.

By the use of the said arrangement, it will suffice to secure the axle 2 to the cockpit of the aeroplane in the suitable position, in order to assure the proper disposition of all controls, and the relatively exact position of the parts assuring their normal functioning.

All reactions of the several controls are supported and absorbed by the axle 2, and on the other hand all the controlling parts are contained in the casing 1 and are thus protected against external effects. Due to this construction, the several controlling parts can be assembled to form a self-contained plural control unit in the factory, hence affording an accurate construction. The different power transmission parts contained in the casing or supported by the same, have a reduced length as compared to that of the corresponding usual parts, which permits, while reducing their weight, to trim such parts and thus to obviate all play and all lack of rigidity. The apparatus has as a result of this construction a reduced size, and the pilot is hence in a more comfortable position.

The described parts may consist of any suitable material and may be assembled as desired, and the construction shown in Figs. 2 and 4 is given solely by way of example.

The said casing may comprise any suitable number of controlling devices adapted for the operation of all parts of the aeroplane.

The wheel 4 and the shaft 3 to which it is keyed, may comprise all connecting parts or the like such as speed increasing or decreasing devices.

The said invention relates to the control of all flying and other devices for aeroplanes, and it can be used in all cases in which an aeroplane is subject to several different controls. The invention is further applicable to airships as well as to submarine craft, and servo-motors may be mounted upon the different power transmission devices in order to provide for all controls by a simple operation effected by the pilot. All such craft may be classified herein for present purposes with aeroplanes and flying devices under the general term of dirigible craft provided with movable members for effecting the navigation thereof.

Having now fully described my invention, I claim:

1. In a dirigible craft provided with movable members for effecting the navigation thereof, the combination, with a plurality of power transmission devices connected to said movable members, of a pivotal support in said craft and a self contained plural control unit mounted on said pivotal support and having a plurality of control devices assembled thereon, said power transmission devices being connected to said control devices, whereby to operate said movable members.

2. In a dirigible craft provided with movable members for effecting the navigation thereof, the combination, with a plurality of power transmission devices connected to said movable members, of a self-contained plural control unit mounted in said craft upon a pivotal support, a hand wheel and movable means associated therewith supported upon said unit and connected to one of said power transmission devices, and a pedal also supported upon said unit with associated movable means connected to another of said power transmission devices.

3. In a dirigible craft provided with movable members for effecting the navigation thereof, the combination, with a plurality of power transmission devices connected to said movable members, of a self-contained plural control unit comprising a casing mounted in said craft upon a pivotal support, a hand wheel and movable means associated therewith supported upon said unit and connected to one of said power transmission devices, and a pedal also supported upon said unit with associated movable means connected to another of said power transmission devices.

4. In a dirigible craft provided with movable members for effecting the navigation thereof, the combination, with a plurality of power transmission devices connected to said movable members, of a self-contained plural control unit mounted in said craft upon a pivotal support, a hand wheel and movable means associated therewith supported upon said unit and connected to one of said power transmission devices, and a pedal also supported upon said unit with associated movable means connected to another of said power transmission devices, and a connection between said unit per se and yet another of said power transmission devices.

5. In a dirigible craft provided with movable members for effecting the navigation thereof, the combination, with a plurality of power transmission devices connected to said movable members, of a rigid frame secured in said craft, a plural control support rockably mounted upon said frame and connected to one of said power transmission devices, a hand wheel mounted upon said plural control support and having motion transmission members associated therewith, and a rockable transmission member connected thereto and mounted upon said frame and also further connected to another of said power transmission devices, said rigid frame constituting a pivotal mounting for both said control support and said transmission member so that they are independently rockable upon the same axis.

6. In a dirigible craft provided with movable members for effecting the navigation thereof, the combination, with a plurality of power transmission devices connected to said movable members, of a rigid frame secured in said craft, a plural control support rockably mounted upon said frame and connected to one of said power transmission devices, a hand wheel mounted upon said plural control support and having motion transmission members associated therewith, a rockable motion transmission member connected thereto and mounted on said frame and further connected to another of said power transmission devices, and a pedal also mounted upon said frame and connected to yet another of said power transmission devices, said rigid frame providing pivotal support upon which said motion transmission member, said plural control support and said pedal may be independently rocked about a common axis.

7. In a dirigible craft provided with movable members for effecting the navigation thereof, the combination, with a plurality of power transmission devices connected to said movable members, of a plurality of control devices, means associated with said control devices connecting the same with said power transmission devices, and an assembly member pivotally mounted in said craft and itself constituting an additional control member, aforesaid control members and all said means associated therewith being associated with said assembly member to form a plural control unit, and said assembly member, said control devices and at least one means associated with each of said control devices being rockable about a common horizontal axis.

8. In a dirigible craft provided with movable members for effecting the navigation thereof, the combination, with a plurality of power transmission devices connected to said movable members, of a plurality of control devices, means associated with said control devices connecting the same with said power transmission devices, and an assembly member held in said craft, said control members and all said means associated therewith being associated with said assembly member to form a plural control unit, and at least one of said control devices and also at least one each of all of said means associated with each of said control devices being rockable about a common horizontal axis.

In testimony whereof I have hereunto set my hand at Paris this sixteenth day of November 1929.

JEAN QUESSETTE.